United States Patent
Meschter et al.

(10) Patent No.: US 8,703,358 B2
(45) Date of Patent: Apr. 22, 2014

(54) FUEL CELL FEED SYSTEMS

(75) Inventors: John Meschter, New York, NY (US); Bryan Grygus, Troy, NY (US); Nagaraja K. Yaddanapudi, Tarrytown, NY (US); Keith Brown, Clifton Park, NY (US); James Prueitt, Ballston Lake, NY (US); Karen Thatcher, East Berne, NY (US); Michael Chen, Cambridge, MA (US); George Allen, Middle Grove, NY (US); Wenpeng Liu, Niskayuna, NY (US); Zhigang Qi, Schenectady, NY (US); Garrick D. S. Smith, Madison, WI (US)

(73) Assignee: MTI Microfuel Cells, Inc., Albany, NY (US)

( * ) Notice: Subject to any disclaimer, the term of this patent is extended or adjusted under 35 U.S.C. 154(b) by 1053 days.

(21) Appl. No.: 12/274,567

(22) Filed: Nov. 20, 2008

(65) Prior Publication Data

US 2010/0124678 A1   May 20, 2010

(51) Int. Cl.
*H01M 8/04* (2006.01)
(52) U.S. Cl.
USPC .................................................... 429/513
(58) Field of Classification Search
None
See application file for complete search history.

(56) References Cited

U.S. PATENT DOCUMENTS

| | | | |
|---|---|---|---|
| 3,189,041 A | 6/1965 | Hansen | |
| 3,749,353 A | 7/1973 | Pauliukonis | |
| 3,923,423 A | 12/1975 | Lauck | |
| 3,994,357 A * | 11/1976 | Smitley | 180/282 |
| 4,316,233 A | 2/1982 | Chato et al. | |
| 4,703,913 A | 11/1987 | Hunkapiller | |
| 4,852,851 A | 8/1989 | Webster | |
| 5,088,515 A * | 2/1992 | Kamen | 137/15.17 |
| 5,336,062 A | 8/1994 | Richter | |
| 5,706,859 A | 1/1998 | Bäcklund | |
| 5,965,813 A * | 10/1999 | Wan et al. | 73/204.26 |
| 5,976,725 A | 11/1999 | Gamo et al. | |
| 6,056,268 A | 5/2000 | Nagalski | |
| 6,069,392 A | 5/2000 | Tai et al. | |
| 6,241,480 B1 | 6/2001 | Chu et al. | |
| 6,326,211 B1 | 12/2001 | Anderson et al. | |
| 6,485,273 B1 | 11/2002 | Goodwin-Johansson | |
| 6,495,277 B1 | 12/2002 | Edlund et al. | |

(Continued)

FOREIGN PATENT DOCUMENTS

| | | |
|---|---|---|
| EP | 1785652 A1 | 5/2007 |
| JP | 2003532252 A | 10/2003 |
| JP | 2004319412 A * | 11/2004 |
| JP | 2008218076 A | 9/2008 |
| WO | 2010059688 A2 | 5/2010 |

OTHER PUBLICATIONS

Yao, Electroosmotic Pumps Fabricated from Porous Silicon Membranes, Jun. 3, 2006, J. Microelectrochemical Systems, vol. 15, pp. 717-729.*

(Continued)

*Primary Examiner* — Ula C Ruddock
*Assistant Examiner* — Daniel Gatewood
(74) *Attorney, Agent, or Firm* — Burns & Levinson LLP; Orlando Lopez

(57) ABSTRACT

Fuel feed systems capable of providing substantially consistent flow of fuel to a fuel cell and also capable of tolerating varying pressures from a reservoir (also referred to as fuel supply or fuel cell cartridge) and the fuel cell while maintaining substantially consistent control flow to the fuel cell are disclosed.

25 Claims, 10 Drawing Sheets

(56) References Cited

U.S. PATENT DOCUMENTS

| | | | |
|---|---|---|---|
| 6,561,224 | B1 | 5/2003 | Cho |
| 6,763,710 | B2 | 7/2004 | Mayer et al. |
| 6,874,530 | B2 | 4/2005 | Nau et al. |
| 6,886,576 | B2 | 5/2005 | Barholm-Hansen |
| 6,979,508 | B2 | 12/2005 | Gurin et al. |
| 7,115,335 | B2 * | 10/2006 | Eggum .................. 429/443 |
| 7,156,131 | B2 | 1/2007 | Adams et al. |
| 7,291,191 | B2 | 11/2007 | Kaye |
| 7,291,410 | B2 | 11/2007 | Kinkelaar et al. |
| 7,874,530 | B2 * | 1/2011 | Kim et al. .............. 248/176.1 |
| 2004/0209354 | A1 * | 10/2004 | Mathies et al. ........... 435/287.2 |
| 2005/0039809 | A1 * | 2/2005 | Speldrich ................... 138/39 |
| 2005/0147864 | A1 | 7/2005 | Eggum |
| 2006/0024554 | A1 | 2/2006 | Kaye et al. |
| 2006/0127733 | A1 | 6/2006 | Kaschmitter et al. |
| 2007/0051757 | A1 * | 3/2007 | Lim et al. ................ 222/630 |
| 2008/0199759 | A1 | 8/2008 | Adams et al. |
| 2010/0122733 | A1 | 5/2010 | Grygus et al. |
| 2010/0124676 | A1 | 5/2010 | Meschter et al. |
| 2010/0124689 | A1 | 5/2010 | Meschter et al. |

OTHER PUBLICATIONS

Notification of Transmittal of the International Search Report and the Written Opinion of the International Searching Authority, or the Declaration, International Publication No. WO 2010/059688 A3, published on May 27, 2010.

M. Ashauer et al., "Thermal Flow Sensor for Liquids and Gases", 11th IEEE Proceedings (98CH36176), International Workshop on "Micro Electro Mechanical Systems", 1998.

G. Stemme, "Micro fluid sensors and actuators", Proceedings of the Sixth International Symposium on Micro Machine and Human Science, Oct. 4-6, 1995, pp. 45-52.

S. Yao et al., "Electroosmotic Pumps Fabricated from Porous Silicon Membranes," Journal of Microelectromechanical Systems, V. 15, No. 3, 2006.

S-I Ohira et al., "Miniature Liquid Flow Sensor and Feedback Control of Electroosmotic and Pneumatic Flows for a Micro Gas Analysis System," Analytical Sciences, vol. 22 (2006), No. 1, p. 61.

* cited by examiner

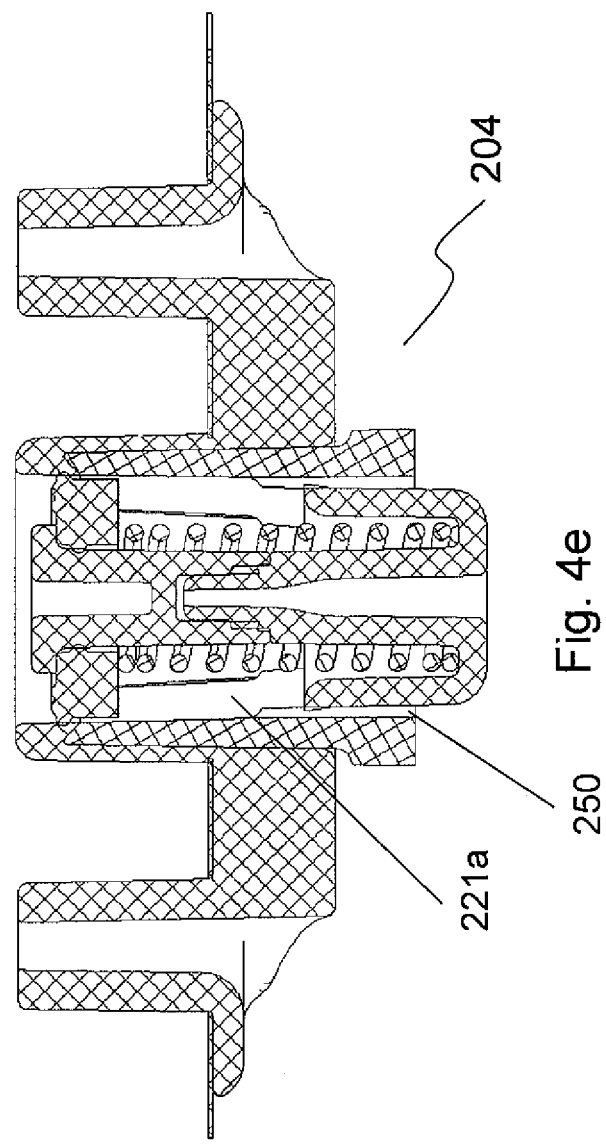

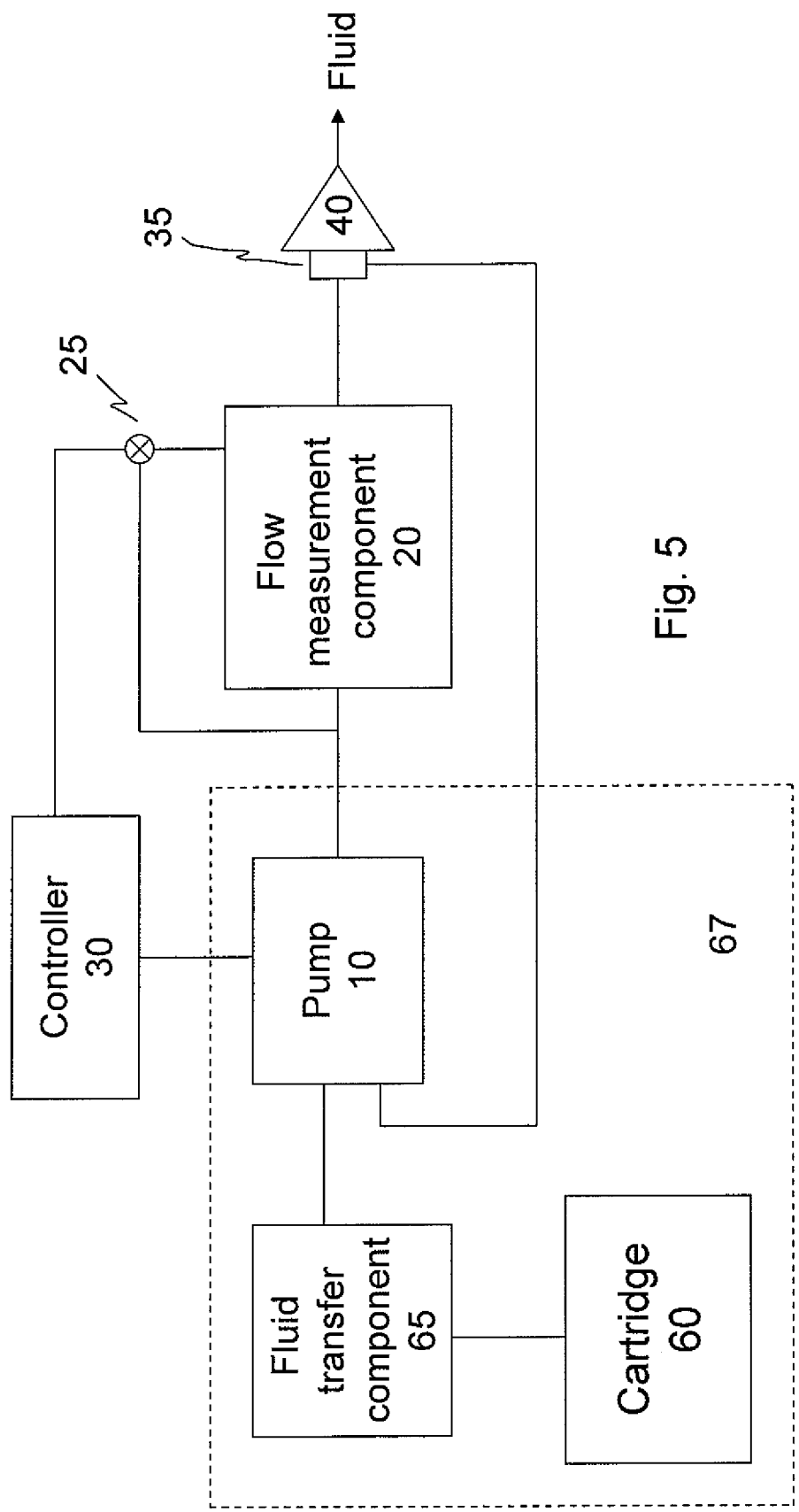

FUEL CELL FEED SYSTEMS

CROSS REFERENCE TO RELATED APPLICATIONS

This application is related to commonly assigned U.S. patent application Ser. No. 12/274,478, entitled PRESSURE BIASED MICRO-FLUIDIC VALVE, filed on Nov. 20, 2008, and to commonly assigned U.S. patent application Ser. No. 12/274,515, entitled SYSTEM TO RESERVOIR CONNECTOR, filed on Nov. 20, 2008, both of which are incorporated by reference herein in their entirety.

BACKGROUND

These teachings relate generally to fuel cell feed systems, and particularly to a vapor feed direct oxidation fuel cell.

A fuel cell induces an electrochemical reaction between fuel such as methanol or hydrogen and oxygen to convert chemical energy directly into electric energy, and therefore high power generation efficiency is obtained; the noise is very low, and the size can be reduced because there are few mechanical moving parts. Such a fuel cell is relatively easy in installation and management, and is hence used in distributed power supply systems, and power supplies for communication equipment, etc.

Portable electronic devices such as cell phones and laptop computers are extremely reduced in size and weight and enhanced in performance. Secondary batteries such as high performance nickel metal hydride batteries and lithium ion batteries are conventionally used as the power source.

For these conventional secondary batteries, it is difficult to extend the operating time and reduce the size and weight further. Accordingly, fuel cells are candidate power sources for portable electronic devices.

Direct oxidation fuel cells that use liquid fuel through direct oxidation at the anode are most promising to replace batteries because of the potentially higher energy density. When methanol is used as the fuel, it is called direct methanol fuel cell (DMFC), which is most widely investigated. In a DMFC, methanol and air are supplied to the fuel cell anode and cathode, respectively, generating electricity, plus heat and water. A conventional DMFC uses dilute methanol solution of not higher than 3 M, and typically not higher than 1 M. Due to the presence of a large percentage of water in 1 M methanol aqueous solution (about 97% wt.), such a DMFC system gives up too much of the achievable energy density.

Fuel cells developed at MTI Micro Fuel Cells Inc. use neat methanol (i.e., 100% methanol) to feed the fuel cell anode without adding any water to either the fuel or the ambient air. The liquid methanol is vaporized once it gets into the fuel cell, and the resulting methanol vapor transports to the anode catalyst layer to be subsequently oxidized.

Fuel feed into a controllable vapor feed DMFC presents some unique challenges. A fuel feed system for such a fuel cell should have, in the smallest possible package, the ability to substantially constantly feed fuel at typically very low feed rates against a variable vapor back pressure from the fuel cell side, mainly due to the enormous volume expansion when the liquid methanol is vaporized to vapor. With variable back pressure from the fuel cell, coupled with the requirement for controllable feed rates of fuel according to the varied power output requirements by the load, a successful fuel feed system should be responsive accurately to the fuel flow requirements.

BRIEF SUMMARY

Embodiments of fuel feed systems, which are capable of providing substantially consistent and substantially smooth flow of fuel to the fuel cell, and are capable of tolerating varying pressures from a reservoir (also referred to as fuel supply or fuel cell cartridge) and the fuel cell while maintaining substantially consistent control of flow to the fuel cell, are presented.

Various embodiments are disclosed including, among others, embodiments for transferring a fuel from a cartridge to a pump via a connector, embodiments including controlling and measuring flow rates of the fuel, embodiments utilizing electro-osmotic pumps, and embodiments capable of tolerating bubbles of a predetermined bubble characteristic dimension.

Methods of operation of the fuel feed system are also disclosed.

BRIEF DESCRIPTION OF THE DRAWINGS

Aspects of the present teachings are pointed out with particularity in the appended claims. The present teachings are illustrated by way of example in the following drawings in which like references indicate similar elements. The following drawings disclose various embodiments of the present teachings for purposes of illustration only and are not intended to limit the scope of the teachings. For purposes of clarity, not every component may be labeled in every figure. In the figures:

FIGS. 4b-4e are graphical schematic representations of another embodiment of the pump-to-reservoir connector in another embodiment of the system of these teachings; and FIG. 5 is a schematic representation of yet another embodiment of the system of these teachings.

DETAILED DESCRIPTION

The present teachings may be understood by the following detailed description, which should be read in conjunction with the attached drawings. The following detailed descriptions of certain embodiments are by way of example only and are not meant to limit the scope of the present teachings.

"Diaphragm" as used herein refers to an element capable of being manipulated such that it can at least partially block the passage of fluid flow between an input port and an output port in one position (contracted) and permit the flow of fluid between an input port and an output port in another position (for example, extended). An "actuating force" is a force that is capable of extending a diaphragm. A "valve seat" is an element designed to accept a portion of the diaphragm when contracted.

The fuel feed system disclosed hereinbelow comprises implementation of methodologies about, among others, transferring a liquid such as methanol from a reservoir (or cartridge) to a pump, controlling the liquid flow rate, and measuring the liquid flow rate.

Figure 1A:
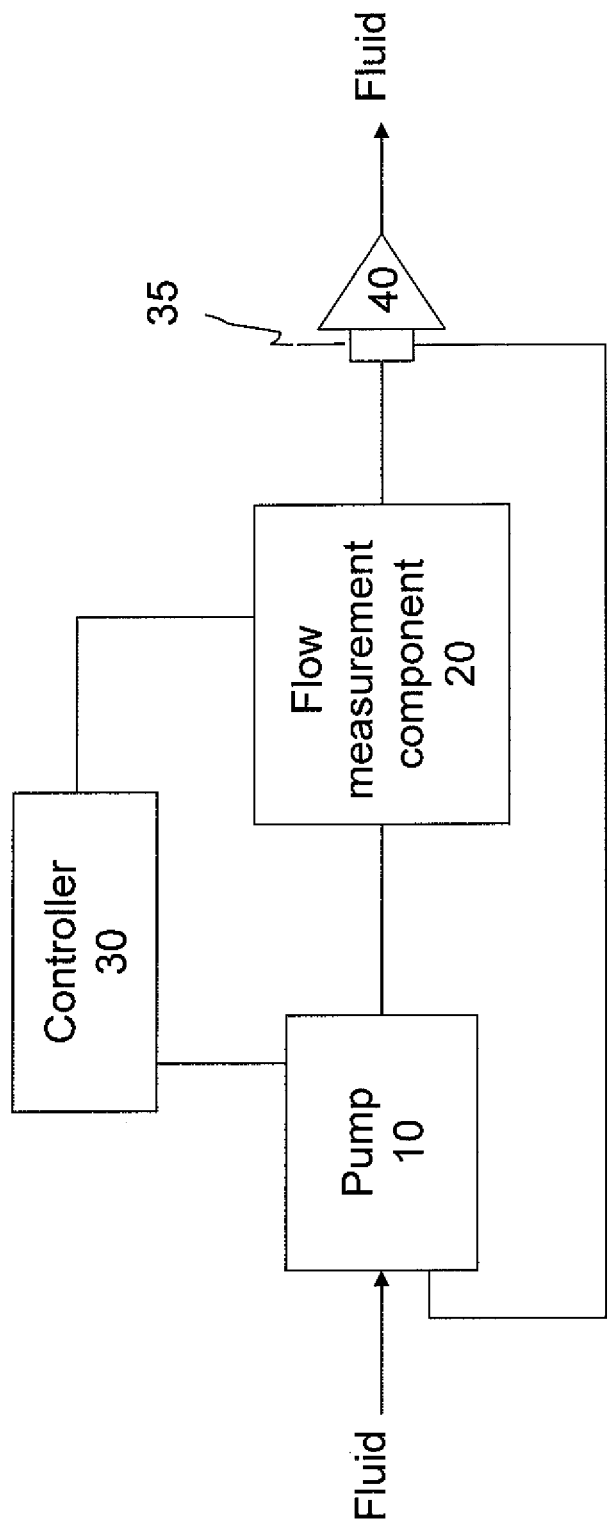
FIG. 1a is a schematic representation of one embodiment of the system of these teachings.

In one embodiment, shown in FIG. 1a, the fuel feed system of these teachings includes a pump 10 receiving fuel at an input to the pump, a flow measurement component (flow sensor) 20 operatively connected to an output of the pump, an output from the flow measurement component 20 being indicative of flow rate in the pump, and a valve 40 operatively connected to the flow measurement component 20, receiving fuel from the flow measurement component 20. The output from the flow measurement component 20 is provided to a controller 30. In an embodiment of the system of these teachings, the valve 40 biases or balances the pressure from the reservoir or pump input in order to ensure that the pump is only required to overcome a nominal pressure to allow fluid flow through the valve. In one instance, the valve is operatively connected to the flow measurement component 20 and includes a pressure inlet port 35 operatively connected to the input of said pump, the pressure inlet port providing an exerted pressure. The exerted pressure is substantially equivalent to an input pressure of the pump. The valve is capable of allowing flow from an output of the flow measurement component 20 to the fuel cell when an output pressure of the flow measurement component exceeds a predetermined pressure, the predetermined pressure including the exerted pressure.

Figure 1B:
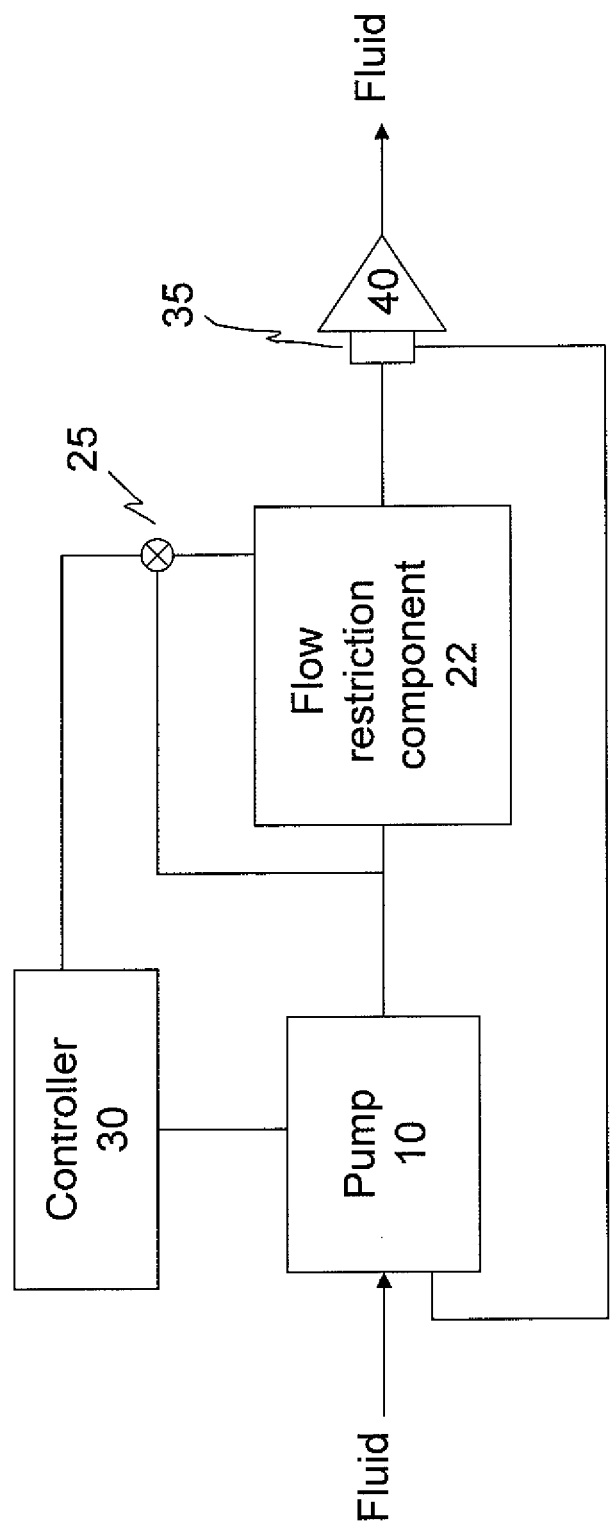
FIG. 1b is a schematic representation of another embodiment of the system of these teachings.

In another embodiment, shown in FIG. 1b, the flow measurement component (flow sensor) 20 (FIG. 1a) includes a flow restriction component 22 operatively connected to an output of the pump 10, a differential pressure sensor 25 connected across the flow restriction component. An output from the differential pressure sensor 25 is indicative of flow rate in the pump 10.

A number of commonly available flow sensors (20) can be used in accordance to these teachings. For example, but not limited to, the flow sensor for liquids described by: M. Ashauer, H. Gloseh, F. Hedrich, N. Hey, H. Sandmaier and W. Lang, in "Thermal Flow Sensor for Liquids and Gases", 11$^{th}$ IEEE Proceedings (98CH36176), International Workshop on "Micro Electro Mechanical Systems", 1998, which is incorporated by reference herein in its entirety; the flow sensors described by G. Stemme, "Micro fluid sensors and actuators", Proceedings of the Sixth International Symposium on Micro Machine and Human Science, 4-6 Oct. 1995, pp. 45-52, which is also incorporated by reference herein in its entirety; and the flow sensor described in U.S. Pat. No. 6,763,710, also incorporated by reference herein in its entirety.

Figure 1C:
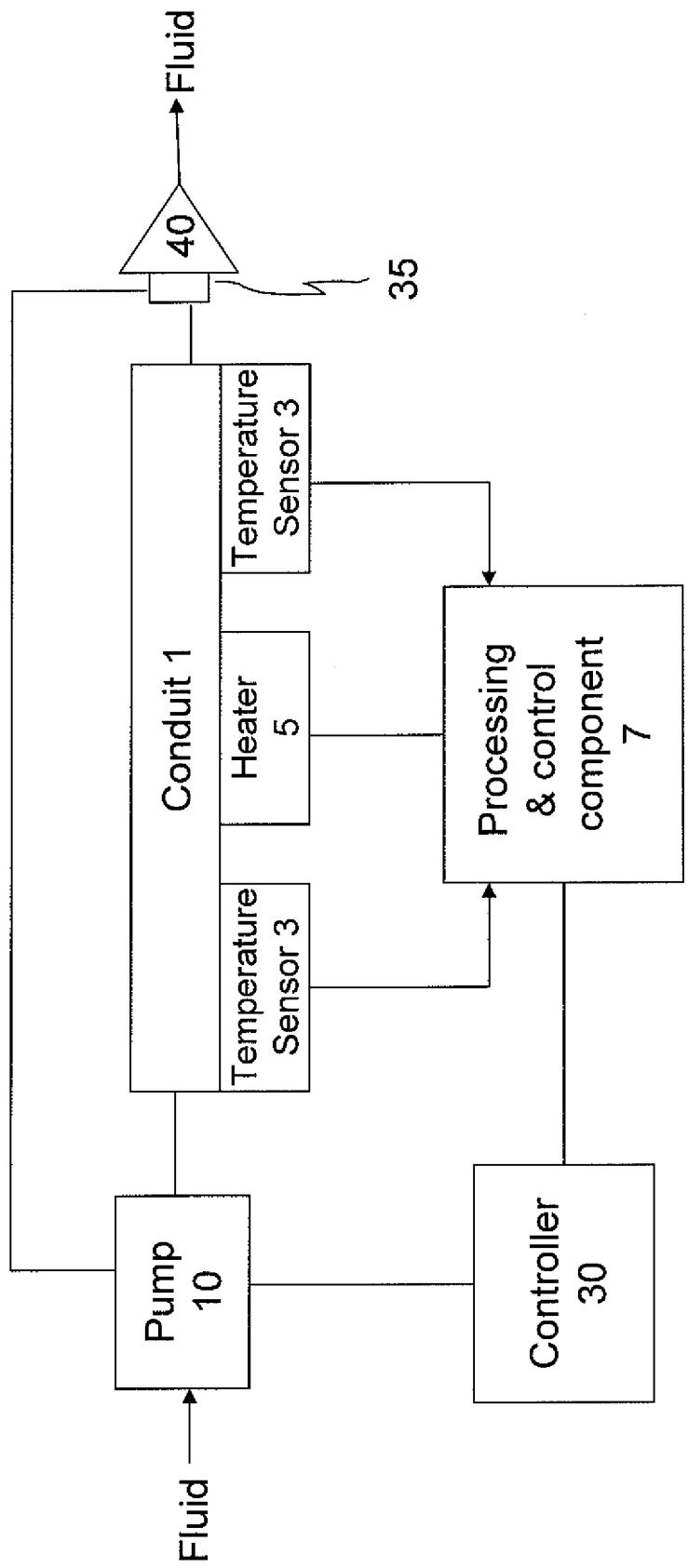
FIG. 1c is a schematic representation of yet another embodiment of the system of these teachings.

A further embodiment of the flow sensor 20 (FIG. 1a) is shown in FIG. 1c. Referring to FIG. 1c, the fuel is provided to a conduit 1. The conduit 1 constitutes or includes a substrate on which a heating element (heater) 5 and two temperature sensors 3 are disposed (arranged); the temperature sensors being arranged before and after, in the fluid flow direction, the heating element 5. The heating element 5 and the temperature sensors 3 are in thermal contact with the fluid flowing through the conduit 1. A processing and control component 7 processes signals from the temperature sensors 3. The processing and control component 7 substantially determines a fluid flow velocity and provides an output to the controller 30. A driver for the pump 10 is one of the components that are under the control of controller 30.

Figure 2:
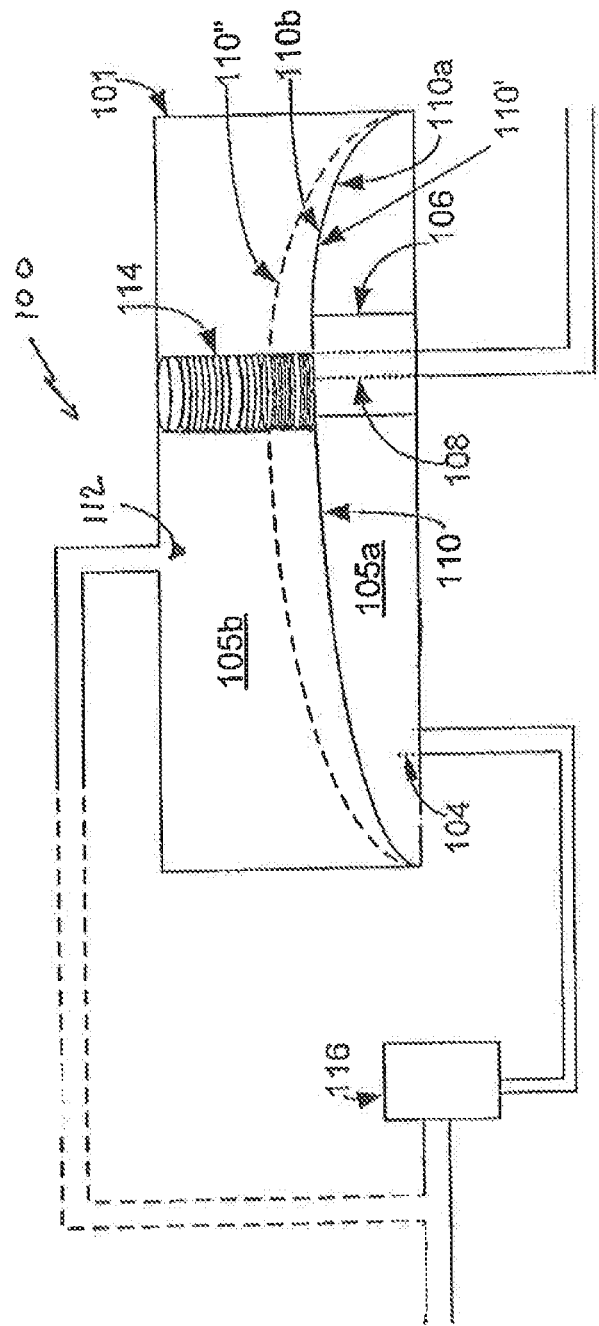
FIG. 2 is a graphical schematic representation of one embodiment of a component of an embodiment of the system of these teachings.

Embodiments of a valve are disclosed that allow the control and adjustment of a fluid flow between a valve inlet port and a valve outlet port as a function of the pressure at the valve inlet port. In one embodiment, the valve that includes two ports—a valve inlet port, and a valve outlet port, and one or more valve seats circumscribing one or more of the two ports. The valve further includes a flexible diaphragm having first and second major surfaces. The first major surface in a closed position acts as a valve face to cover the one or more valve seats preventing fluid communication therebetween. In an open position, the first major surface unseals the valve inlet port and the valve outlet port and allows fluid communication therebetween. In addition, the valve includes a first-pressure-inlet coupled to the second major surface of the flexible diaphragm. The said first-pressure-inlet provides a first pressure to said second major surface to attempt to move the diaphragm into the closed position. The valve also includes a reference pressure-providing component operatively coupled to the second major surface of said flexible diaphagm. The reference pressure-providing component provides a reference pressure. In one instance, fluid communication between said valve inlet and said valve outlet can be controlled and adjusted by utilizing the first pressure and the reference pressure. In one instance, fluid communication between the valve inlet port and the valve outlet port occurs when an output force exerted by a valve inlet against the first major surface exceeds an input force exerted by the combination of the reference pressure and the first pressure against the second major surface. FIG. 2 depicts one embodiment of a valve of the pressure biased micro-fluidic valve. In particular, a valve 100 includes a valve outlet seat 106 that extends within the interior 101 of the valve 100. The valve outlet seat circumscribes a valve outlet port 108 that may be connected to an (or more) ancillary apparatus to which flow is to be regulated. Typically, the valve 100 is constructed of molded plastic material, although other materials may be used as well. The valve 100 further includes a valve inlet port 104 that may be connected to a fluid or gas source 116 from which flow is to be regulated. The valve 100 also includes a diaphragm 110 that includes a first major surface 110a located within region 105a and a second major surface 110b located within region 105b. The diaphragm 110 may have a first position 110' and a second position 110".

In the first position, the first major surface 110a covers the valve outlet seat 106 and the valve outlet port 108. In this position, the first major surface acts as a closed valve face and prevents fluid communication between valve inlet port 104 and the valve outlet port 108.

In the second position, the first major surface 110a uncovers the valve outlet seat 106, and valve outlet port 108; the valve inlet port 104 is also not covered by the first major surface 110a. In this position, the first major surface acts as an open valve face and allows fluid communication between valve inlet port 104 and the valve outlet port 108.

The valve 100 also includes a first-pressure-inlet 112. The first-pressure-inlet 112 provides pressure to exert against the second major surface 110b of the diaphragm 110. In the embodiment depicted in FIG. 2, a reference pressure-providing component 114 is also included.

In one embodiment, utilizing a thin diaphragm, each of the first and second surfaces has substantially equal surface areas. As is known, force pressure*surface area, or F=P*A. In the said second position 110", the forces on the first and second major surfaces become $$P_{out}*A_{first} \geq (P_{in}+P_{ref})*A_{second} \qquad (1)$$

Where $A_{first}$ is the surface area of the first major surface, $A_{second}$ is the surface area of the second major surface, $P_{out}$ is the pressure resulting from flow from the valve inlet port 104, $P_{in}$ is the pressure resulting from the first pressure inlet 112, and $P_{ref}$ is the pressure resulting from the reference pressure-providing component 114 or, in one embodiment, from the diaphragm 110. However since, for example, in embodiments utilizing a thin diaphragm, $A_{first}$ is substantially equal to $A_{second}$, equation (1) can be simplified to:

$$P_{out} \geq P_{in}+P_{ref}$$

This then is the condition in which the diaphragm moves from position 110' to 110" and moves away from the valve inlet port and valve outlet port and allows fluid communication therebetween.

It should be noted that although the reference pressure can be provided by a separate pump or other pressure generating element, other means of generating the reference pressure are also within the scope of this teachings. The reference pressure may also be generated by a force, for example, but not limited to, provided by a spring, a bimetallic material, or the force may be generated by the elasticity of the diaphragm 110 itself. Although in FIG. 2, a reference pressure generating component 114 is shown, in one embodiment of the valve of these teachings in which the reference pressure is generated by the elasticity (also referred to as the spring coefficient or the elastic coefficient or elastic constant) of the diaphragm 110. The reference pressure generating component 114 shown in FIG. 2 may be, in some embodiments, an external component 114, such as, but not limited to, an external spring or a bimetallic component.

In another embodiment, for example, with thicker diaphragm, the first and second surfaces have unequal surface areas. As is known, force=pressure*surface area, or F=P*A. In the said second position 110", the forces on the first and second major surfaces become $$P_{out}*A_{first} \geq (P_{in}+P_{ref})*A_{second} \quad (1)$$

Thus, the control of the fluid flow between the valve inlet port and the valve outlet port may be a function of $P_{in}$, $P_{out}$, $P_{ref}$, and the ratio of the first to the second surface areas.

Other embodiments of the pressure biased microfluidic pump, such as those disclosed in U.S. Patent Publication No. 2010-0122733, corresponding to U.S. patent application Ser. No. 12/274,478, both of which are incorporated by reference herein in their entirety, are also within the scope of these teachings.

In some embodiments, the pumps include microelectromechanical systems (MEMS) pumps, such as those used to pump ink in inkjet printers or those used in drug delivery systems or those used to cool micro integrated circuit chips, among others. More specifically, embodiments of MEMS pumps include field-induced flow pumps and membrane-displacement pumps. Field induced pumps utilize an electrical or magnetic field to produce flow. An embodiment of a field-induced pump is an electro-osmotic pump, which is capable of moving liquid in small spaces, such as capillary spaces, by applying a direct circuit (DC) potential across at least a portion of a capillary column. The direction of fluid flow in the capillary column can also be reversed by reversing the direction of the DC potential. Other embodiments of field-induced pumps include, but are not limited to, electro-hydrodynamic pumps and magnetohydrodynamic pumps. Membrane-displacement pumps utilize a force, e.g., an electrical charge, applied to a membrane, causing the membrane to move or vibrate to propel the fluid-to-be-pumped. Embodiments of membrane-displacement pumps include, but are not limited to, electrostatic pumps and thermopneumatic pumps.

An electro-osmotic pump (also referred to as an electro-kinetic (EK) pump) contains no moving parts and is capable of moving fluids through tight spaces. Electro-osmotic pump advantageously can move fluid with low or no conductivity. An electro-osmotic flow is created when a DC potential is applied across a porous media. The liquid in the porous media is driven from one electrode to the other electrode, when exposed to the DC electrical field. Electro-osmotic pumping is useful in micro-channels, such as those within filler inserts or outlet ports, and in slow and controlled flow. Electro-osmotic flow is discussed, for example, in U.S. Pat. No. 3,923,426 entitled, "Electroosmotic Pump and Fluid Dispenser Including Same," issued on Dec. 2, 1975; and in S. Yao, A. M. Myers, J. D. Posner, K. A. Rose, and J. G. Santiago, Electroosmotic Pumps Fabricated from Porous Silicon Membranes, Journal of Microelectromechanical Systems, V. 15, No. 3, 2006; both of which are incorporated by reference herein in their entirety.

In several instances (including instances in which the fuel cell is a vapor fed direct oxidation fuel cell), it is desirable to maintain a substantially consistent fuel feed rate to the fuel cell. Several embodiments of micro-electromechanical pumps, including electro-osmotic pumps, are capable of maintaining a substantially consistent fuel feed rate to the fuel cell.

However, some embodiments of pumps, including electro-osmotic pumps, do not have a known volumetric displacement capability. Also, in some instances, variation of environmental conditions can affect the fuel feed from the pump. In one embodiment of the method of these teachings, a flow restriction component is operatively connected to the output of the pump. A differential pressure sensor is connected substantially across the flow restriction component. An output of the differential pressure sensor is indicative of flow rate in the pump. The output of the differential pressure sensor is provided to a controller/driver (referred to as a "controller" throughout this application) for the electro-osmotic pump. By controlling the input to the pump through conventional means, the flow rate is controlled in order to maintain substantially consistent controlled fuel flow to the fuel cell. Control of the electro-osmotic pump (or any other pump embodiment) is performed by conventional means. (See, for example, Shin-Ichi Ohira, Kei Toda, Miniature Liquid Flow Sensor and Feedback Control of Electroosmotic and Pneumatic Flows for a Micro Gas Analysis System, Analytical Sciences, Vol. 22 (2006), No. 1, p. 61, incorporated by reference herein in its entirety.

In some embodiments, a temperature sensor is used in addition to the differential pressure sensor and both the output of a temperature sensor and the differential pressure sensor are provided to the controller.

Embodiments of the flow restriction component include, but are not limited to, an orifice of predetermined diameter (typically small), a porous disk or a length of capillary tubing. In one instance, a length of capillary tubing (a capillary channel) is used as a flow restriction component, where the cross-section diameter of the capillary tubing is much smaller than the length. In another instance, a helical coil of capillary tubing is used as the flow restriction component.

In some pump embodiments, including electro-osmotic pumps, there is a substantially continuous open path between the pump input (the fuel supply) and the receiving device such as a fuel cell. It is desirable, in many instances, to ensure that fuel does not leak into the fuel cell. It is also desirable, in many instances, to withstanding varying pressures from a fuel reservoir and the fuel cell itself while maintaining substantially consistent controlled fuel flow to the fuel cell. In applying an embodiment of the method of these teachings, a valve is provided, an embodiment of which is disclosed hereinabove, where the valve biases or balances the pressure from the reservoir or pump input in order to ensure that the pump is only required to overcome a nominal constant pressure to allow fluid flow through the valve. In one instance, the valve is operatively connected to the flow measurement component and includes a pressure inlet port operatively connected to the input of said pump, the pressure inlet port providing an exerted pressure. The exerted pressure is substantially equivalent to an input pressure of the pump. The valve is capable of allowing flow from an output of the flow measurement component to the fuel cell when an output pressure of the flow restriction component exceeds a predetermined pressure, the predetermined pressure including the exerted pressure. In the embodiment disclosed hereinabove, the valve includes a valve inlet port operatively connected to receive flow from the flow measurement component (flow restriction component in one embodiment), a valve outlet port operatively connected to provide fuel to the fuel cell, a diaphragm comprising a first major surface and a second major surface, and a pressure inlet port 112 (FIG. 2) operatively connected to the input of the pump, the pressure inlet port providing a pressure exerted against the second major surface, the exerted pressure being substantially equivalent to an input pressure of the pump. A reference pressure is exerted against the second major surface.

In the embodiments including electro-osmotic pumps, the effects of bubbles in the pump operation have to be considered since bubbles can cause variations in the pressure and the fuel feed rate. If the characteristic dimension of the bubbles is kept below a predetermined bubble characteristic dimension, the bubbles can pass through the system (the fuel feed system and the fuel cell) without an appreciable pressure or fuel rate disturbance. For example, these teachings not being limited to only this example, a variation of 1% in a fuel flow rate of 0.5 cc/hr yields 0.005 cc/hr volume which may correspond to a greater than 5 microliter size bubble. In this example, maintaining the characteristic dimension of bubbles below the 5 μL size, the bubbles come to pass in the system without an appreciable disturbance. In one embodiment, the electro-osmotic pump includes a porous medium and a predetermined characteristic dimension of the pores of the porous medium is at most equal to a predetermined bubble characteristic dimension. In some embodiments, the porous medium can be, but is not limited to, a loose frit powder of a grain size on the same order of magnitude or smaller than the tolerable bubble size for the system, a porous open cell foam or fibrous material, such as, but not limited to, wick felt or cotton wool or a material with nanopores. Other embodiments of method and system for mitigating the effects of bubbles, such as those disclosed in U.S. patent application Ser. No. 12/274,446, Managing Gas Bubble Size in a Liquid Flow System, and corresponding U.S. Patent Publication No. 2010-0124676, both of which are incorporated by reference herein in their entirety, are within the scope of these teachings.

In some embodiments in which the flow restriction component is a section of capillary tubing (also referred to as a capillary conduit), a predetermined characteristic dimension (in one instance, diameter) of the capillary conduit is at least equal to, and preferably larger than, the predetermined bubble characteristic dimension. In those embodiments, bubbles readily conforms to the shape of the conduit without being forced into too small of a diameter that the surface tension of the bubble will resist.

Figure 3:
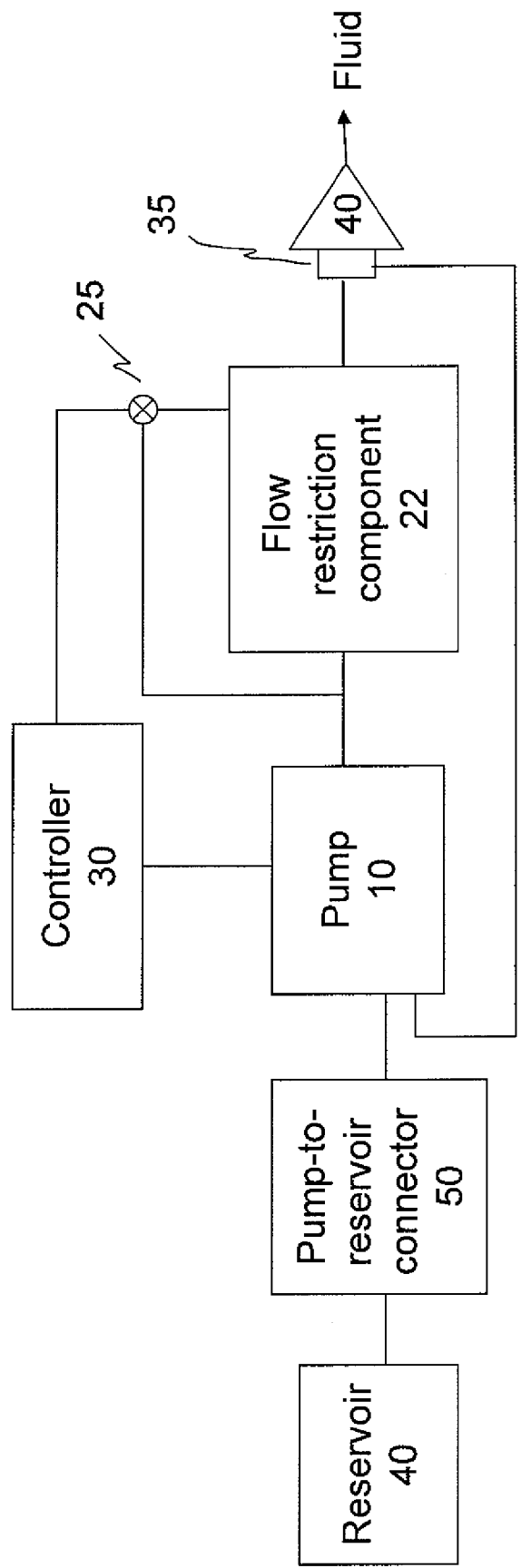
FIG. 3 is a schematic representation of another embodiment of the system of these teachings

In some embodiments, the fuel (methanol in one instance, but these teachings not being limited only to that instance) is contained in a reservoir that can be removed or replaced when consumed; this reservoir is also referred to as a fuel cartridge or cartridge. The cartridge permits the manufacturer to separately fill the device with fuel, whereby the user is not exposed to the fuel. Because the cartridge can be replaced and separated from the rest of the system, an interconnect is needed between the system and the cartridge, where the interconnect (also referred to as a connector) creates a channel for fluid communication of the fuel between the cartridge and the fuel cell via the pump. It is desired, in some instances, the connector is composed of two sub-connectors, and the connector provides positive valve closure on both halves of the connector for minimizing fluid loss and leakage upon connect and disconnect. In the embodiment shown in FIG. 3, a connector 50 is disposed between the pump 10 and the reservoir 40.

In one instance, the connector 50 has a pump-side-sub-connector and a reservoir-side-sub-connector. The connector substantially prevents flow in/out of the reservoir and flow in/out of said pump when in a disengaged configuration. The connector enables fluid communication between the reservoir and the pump when in another (engaged) configuration.

Exemplary embodiments of the pump-to-reservoir (cartridge) connector in accordance with the present teachings are described in more detail below. The pump-to-reservoir connector includes first and second connectors that are complementary to one another and allow for motion of the sub-connectors relative to each other. Each of the first and second sub-connectors includes a series of seals, fluid transfer components (a wick in one embodiment, but these teachings not being limited to only that embodiment) and collapsible/extendable components (springs in one embodiment, but these teachings not being limited to only that embodiment) that ensure positive fluid communication between the two sub-connectors and that provide a substantially leak-proof connection.

In one embodiment, the pump-to-reservoir connector of these teachings includes a pump-side-sub-connector and a reservoir-side-sub-connector. The pump-side-sub-connector has a pump-side-housing, a fluid transfer component disposed in an interior portion of the pump-side-housing and extending from a pump end of the pump-side-housing to a reservoir end of the pump-side-housing, a first portion of the fluid transfer component having a first end proximate to the pump end of the pump-side-housing; the first portion extending from an exterior of the pump end of the pump-side-housing to an interior of the pump-side-housing, a second portion of the fluid transfer component having a second end proximate to the reservoir end of the pump-side-housing, the first portion being able to obtain fluid from the second portion (being in fluid communication), a pump side seal component capable of, in one configuration of the pump-side-sub-connector, preventing fluid transfer in/out of the pump, and an extendable/collapsible component. The pump side seal component includes a first seal component portion disposed substantially coaxially over a portion of the fluid transfer component and a second seal component portion disposed over the second end of the fluid transfer component, the second seal component portion being attachable/detachable (forming a seal/unsealed form) from the first seal component portion. The extendable/collapsible component is operatively connected to the first seal component portion and capable of enabling sealing/unsealing (attachment/detachment) of the first and the second seal component portions; and also capable of retracting the first seal component portion into a second configuration, where the first seal component portion not being disposed, when in the second configuration, over at least part of the portion of the fluid transfer component.

The reservoir-side-sub-connector can operate in an engaged configuration or in a disengaged configuration. The reservoir-side-sub-connector includes a reservoir-side-housing, a reservoir side fluid transfer component adapted to be, when in the engaged configuration, in fluid communication with the fluid transfer component in the pump-side-sub-connector, and a reservoir side seal. The reservoir side fluid transfer component is disposed inside the reservoir-side-housing and has a first reservoir fluid transfer component portion extending from a reservoir side of said reservoir-sidehousing to a location inside said reservoir-side-housing, and a second portion of said reservoir side fluid transfer component. The second portion of said reservoir side fluid transfer component is in fluid communication with the first portion of said reservoir side fluid transfer component. The reservoir side fluid transfer component also has a second end proximate to a pump side of the reservoir-side-housing. The reservoir side seal is capable of, in the disengaged configuration, substantially preventing fluid transfer from the second end of the reservoir side fluid transfer component. The reservoir side seal component has at least a portion disposed over and operatively connected to a collapsible/extendable component, that portion being capable of being retracted and allowing, when in the engaged configuration, fluid communication between the reservoir side fluid transfer component and the fluid transfer component of the pump-side-sub-connector.

The reservoir-side-housing is sized and dimensioned to have a portion, including the pump end of the reservoir-side-housing, which is received in the interior of the pump-side-housing. The reservoir-side-housing also has an opening at the pump side end; that opening being dimensioned to receive the second end of the fluid transfer component of the pump-side-sub-connector and also being also dimensioned to receive the first seal component portion of the pump-side-sub-connector. The reservoir-side-housing also has a channel extending from an opening at the pump side end of the reservoir-side-sub-connector to an opening into the interior of the reservoir-side-sub-connector. The channel is dimensioned to receive the second end of the fluid transfer component of the pump-side-sub-connector. The channel is also dimensioned to receive the second seal component portion of the pump-side-sub-connector.

Figure 4A:
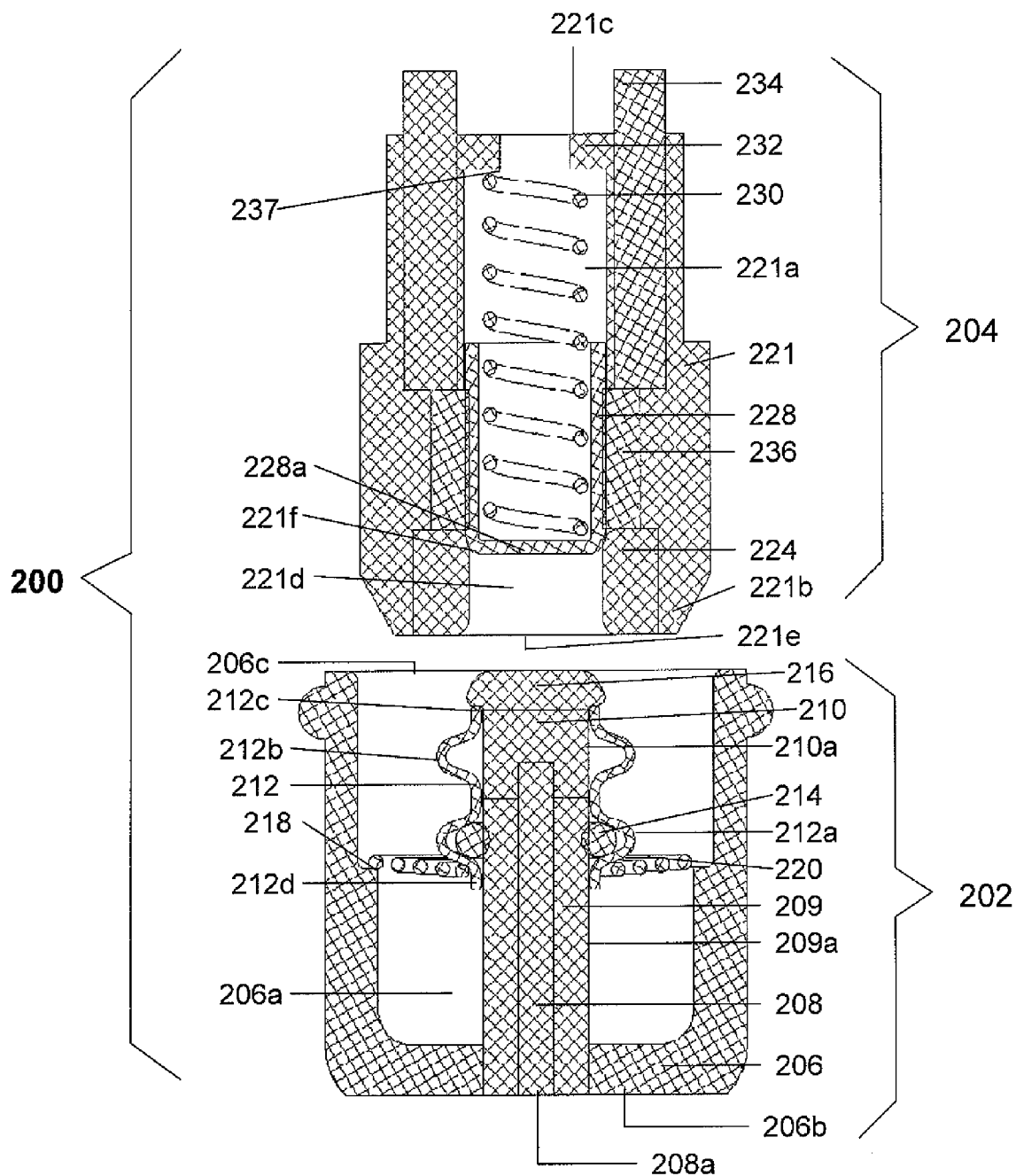
FIG. 4a is a graphical schematic representation of one embodiment of a pump-to-reservoir connector in another embodiment of the system of these teachings.

In one instance, the portion of the reservoir-side-housing, including the pump end of the reservoir-side-housing, when received in the pump-side-housing, operatively connects with the first and second seal component portions of the pump-side-sub-connector and seals to the reservoir-side-housing. The reservoir-side-housing continues its movement and breaks the seal between the first seal component portion and the second seal component portion of the pump-side-housing. The second seal component portion of the pump-side-housing enters into and moves along the channel in the reservoir-side-sub-connector. After the second seal component portion of the pump-side-housing reaches the opening into the interior of the reservoir-side-housing, the pump-side-housing portion operatively connects to the reservoir side seal component and breaks the seal between the reservoir side seal component opening into the interior of the reservoir-side-sub-connector. The portion of the reservoir-side-housing that is received by the pump-side-housing is dimensioned such that the seal between the first seal component portion and the second seal component portion is broken first and subsequently the seal between the reservoir side seal component and the interior of the reservoir-side-sub-connector is broken. One detailed embodiment is shown in FIG. 4a. An alternate embodiment of this connector with only a single fluid transfer component in each side is shown in FIGS. 4b-4e.

To allow the fluid to flow through the connector it is highly desirable to set up a capillary flow process. The use of capillary flow process enables flow under any type of orientation. Capillary flow via a capillary tube (capillary conduit) is one method to establish this flow. Capillary tubes can be built into both sides of the connector and through capillary action provide continuous feed of fluid through the connector. In addition to capillary tubes, porous materials can be employed to provide capillary flow action through "wick" materials. A "wick," as used herein, refers to a material of any porosity or permeability that can wick fuel at a desired (predetermined) flow rate. In one embodiment, the "wick" comprises an absorbent material. Suitable absorbent materials include, but are not limited to, sponges, fibrous polymers such as polyester, polyethylene, polyolefin, polyacetal, and polypropylene, or from natural fibers such as hemp, cotton, or cellulose acetate, or other plant-based fibers. In one instance, when polymeric fibers are used, these fibers are either thermoset or thermoplastic with both the softening and the melting temperatures high enough to withstand potentially high internal temperatures that may exist inside the fuel cells or inside an electronic device. Although the description hereinbelow concentrates on wick materials, the use of capillary tubes (conduits) is also considered part of the art of this application.

A wick transports a liquid such as fuel (methanol in one exemplary instance) mainly through capillary forces. While not desired to be bound by theory, one explanation of capillary action is provided below. Capillary action occurs when the adhesive intermolecular forces between the liquid and the surface of a solid are stronger than the cohesive intermolecular forces within the liquid. The Young-Laplace equation states that the capillary pressure, $P_c$, is proportional to the surface tension, $\gamma$, cosine of the contact angle, $\theta$, of the liquid on the surface of the capillary, and inversely proportional to the effective radius, r, of the meniscus formed at the interface, as shown below, $$P_c = \frac{2\gamma\cos\theta}{r}$$

The fuel (methanol in the exemplary instance) flow in the wick materials is governed by the capillary force, viscous force, and gravity force. As known, methanol is a wetting liquid to most of the surfaces, or, the contact angle is less than 90° with most of the solid materials. Therefore, the capillary force of the methanol in the wick is the key driving force to make it to flow, while overcoming the resistant forces, including viscous force and/or gravity. Since the capillary forces can be much stronger than the combined viscous and gravity forces when the diameter of the capillary is made small enough (such as 100 microns), liquid methanol can be wicked in any direction. In other words, the system is basically orientation independent.

Along the wicking flow direction, the methanol would be trying to move to the downstream section or pores, and then build up a new meniscus in the next available pores. If the next pores are larger, the available methanol will be difficult to build up the new meniscus inside, which leads to a smaller or even zero capillary force to drive the methanol to flow further. Therefore, it is desirable to ensure that the pore size does not get larger along the desired methanol wicking flow direction.

If a single wick is used, it acceptable to have the pore size be the same along the liquid wicking flow direction. However, it would be preferable if the wick is designed such that the pore sizes decrease along the desired methanol flow direction. If two (or more) wicks are used to transport the liquid, such as the case described herein where there is a cartridge (reservoir) side wick and a pump side wick, the pore size within the pump side wick should not be larger than that within the cartridge side wick. Preferentially, the pore size within the pump side wick is smaller than that within the cartridge side wick so that the methanol flow from the cartridge to the fuel cell system will be facilitated.

FIG. 4a illustrates a detailed embodiment of the pump-to-reservoir connector in accordance with the present teachings which is herein schematically shown in a disengaged position. In particular, the pump-to-reservoir connector 200 includes a pump-side-sub-connector portion 202 and a reservoir (cartridge)-side-sub-connector portion 204.

The pump-side-sub-connector portion 202 includes pump side case 206 that includes an interior portion 206a, a pump end 206b, and a connector end 206c. Although a wick is shown as the fluid transfer component in FIG. 4a, it should be noted that other fluid transfer components, such as, but not limited to, other components capable of capillary action, are also within the scope of these teachings. A fluid transfer component (a wick in the embodiment shown) 208 extends from the exterior of the pump end 206b through the interior portion 206a to a fluid transfer component (wick) head 210 that is proximate to the connector end 206c. The wick head 210 has a larger diameter than the wick 208. An end seal 216 is disposed between wick head 210 and the end 206c of the case 206 that is larger in diameter than the wick head 210. A fluid transfer component (wick) cover 209 extending the length of the wick from the pump end 208a to the wick head 210 is coaxially disposed around the wick 208 and is sized such that the thickness of the wick cover 209 is such that the outer surface 209a is leveled to the outer surface of the wick head 210a. In one embodiment, the wick cover 209 can also be a seal. A seal housing 212 is coaxially disposed around the wick cover 209 and includes two raised portions 212a and 212b, respectively. A seal 214 may be disposed within one or both of the raised portions 212a and 212b, although a single seal is depicted in the figure disposed within raised portion 212a, an additional seal may be disposed within raised portion 212b. The seal housing has a front portion 212c that is configured and arranged to press against the portion of the end seal 216 that extends beyond the wick head 210 to seal the wick head 210 to prevent leakage therefrom. The seal housing is configured and arranged to slide along the wick cover 209 in order to expose the outer surface 210a of the wick head 210 and allow fluid communication to occur from the wick head 210 under appropriate conditions. A pump side extendable/collapsible component (spring) seat 218 is disposed within the interior portion 206a and an extendable/collapsible component (a tension spring in the embodiment shown) 220 is seated on the spring seat 218 and a second end 212d of the seal housing 212. As the seal housing 212 slides toward to the pump end 206b, tension spring 220 is extended and biases the seal housing toward the cartridge end 206c.

The reservoir (also referred to as the cartridge, although these teachings are not limited only to a cartridge) side 204 includes a reservoir (cartridge) side case 221 that includes an interior portion 221a, a pump end 221b, and a reservoir (cartridge) end 221c. A channel 221d extends from the opening 221e in the pump end 221b to an opening 221f in the interior portion 221a of the reservoir side case 221. A hollow piston 228 is coaxially disposed on the longitudinal axis of the cartridge side case 221. A portion of a cover seal 224 is disposed over a pump side head 228a of the hollow piston 228. That portion of the cover seal 224 is dimensioned and arranged so that, in the disengaged configuration, that portion of the cover seal 224 seals the opening 221f into the interior portion 221a. In some embodiments, the hollow piston 228 comprises the cover seal 224 or the cover seal 224 comprises a hollow piston 228. A compression spring 230 is disposed within the hollow piston 228. The compression spring 230 is seated at cartridge spring seat 237 that is disposed against a wall 232 at the cartridge end 221c. A first wick 234 extends through the wall 232 and extends coaxially through the interior portion 221a. A second wick 236 is in fluid communication with first wick 234 and is also coaxially disposed within the interior 221a, but is closer to the longitudinal axis of the cartridge case 221. It should be noted that the connection between the pump end of the connector and the pump, and the connection between the reservoir end and the reservoir, are conventional. Other embodiments of the pump-to-reservoir connector, such as those disclosed in U.S. Patent Publication No. 2010-0124689, corresponding to a U.S. patent application Ser. No. 12/274,515, System-to-Reservoir Connector, both of which are incorporated by reference herein in their entirety, shown in FIGS. 4b-4e, are within the scope of these teachings.

Figure 4B:
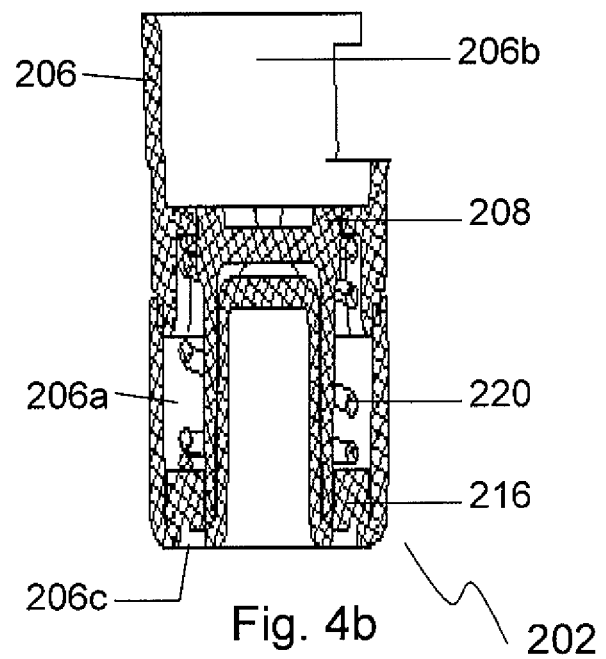
Figure 4C:
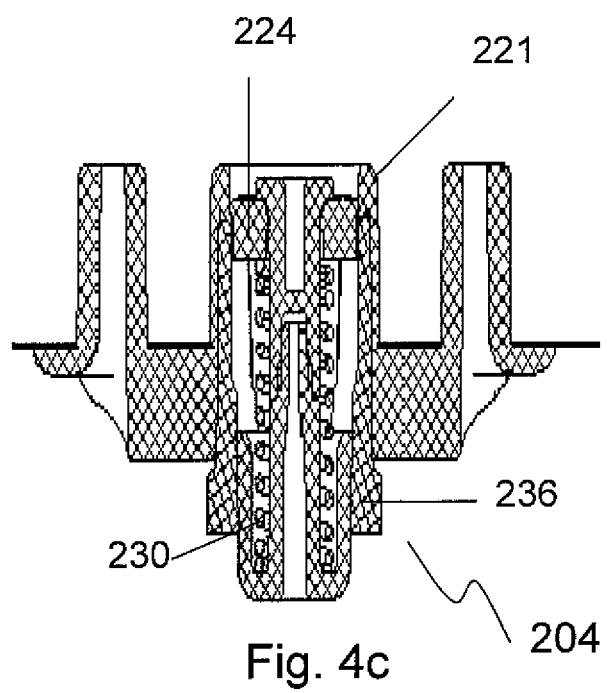
Figure 4D:
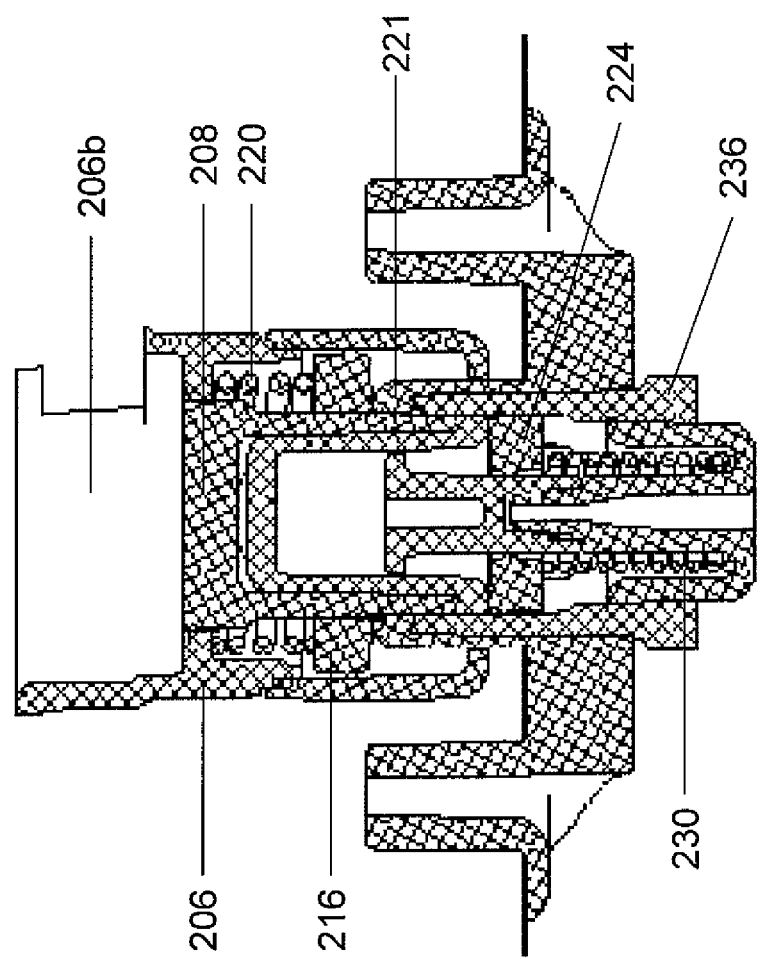

FIG. 4b shows a cross-sectional view of an embodiment of the pump-side-sub-connector 202 that uses only one wick. FIG. 4c shows a cross-sectional view of an embodiment of the reservoir-side-sub-connector 204 that uses only one wick. FIG. 4d shows a cross-sectional view of the reservoir side portion of 204 engaged with the pump side portion 202 and allowing fluid communication between the two sides using the embodiment from FIG. 4b and FIG. 4c.

In one instance, during operation, especially, but not limited to, during multiple insertions, fluid can remain in the reservoir-side-sub-connector portion 204, a situation which may lead to unintentional or undesired leakage of fluid to the pump-side-sub-connector during insertion. Embodiments of the reservoir-side-sub-connector portion 204 with components or features for allowing transfer of fluid from an interior portion (221g, FIG. 4e) of the cartridge (reservoir) side portion 204 of the pump-to-reservoir connector of these teachings detailed below are within the scope of these teachings.

FIG. 4e shows an embodiment of the cartridge side portion 204 (similar to the embodiment shown in FIG. 4c) with a passage (vent) 250 which can be operatively connected to the cartridge or to another container, thereby allowing remaining fluid to exit from the interior of the cartridge side portion 204 of the connector. Other possible structures that allow remaining fluid to exit from the interior of the cartridge-side-sub-connector 204 are openings (vent holes) in the housing 221, where the openings are located at the cartridge end 221c of the cartridge-side-sub-connector, or openings or vents or structures in the wick 236 that allow remaining fluid to exit from the interior of the cartridge-side-sub-connector 204.

One embodiment of the method for operating the pump-to-reservoir connector of these teachings, as described herein above, can be summarized as follows. A connector is provided that has a pump-side-sub-connector and a reservoir-side-sub-connector. The pump-side-sub-connector and the reservoir-side-sub-connector are initially disengaged. Each sub-connector has a seal component substantially preventing flow out of the sub-connector when in a sealed configuration. The seal component in each sub-connector is capable of being unsealed/sealed and is sealed when the pump-side-sub-connector and the reservoir-side-sub-connector are disengaged. A portion of the reservoir-side-sub-connector is inserted into the pump-side-sub-connector while maintaining the seal components in a sealed configuration. First, the reservoir-side-sub-connector seals to the pump-side-sub-connector. Subsequently, insertion of the portion of the reservoir-side-sub-connector into the pump-side-sub-connector continues, rendering the seal component in the pump-side-sub-connector in an unsealed configuration, whereby fluid flow into the pump-side-sub-connector is enabled. Finally, connecting the fluid reservoir-side-sub-connector to the pump-side-sub-connector is completed by completing the insertion, rendering the seal component in the reservoir-side-sub-connector in the unsealed configuration and placing a fluid transfer component in the reservoir-side-sub-connector in fluid communication with a fluid transfer component in the pump-side-subconnector, whereby flow out of the reservoir-side-subconnector is enabled. When connecting a pump to a reservoir, leakage of fluid can be substantially prevented by utilizing a pump-to-reservoir connector of these teachings. The corresponding embodiment of the method for disengaging the pump-to-reservoir connector of these teachings is the reverse of the above described embodiment.

It should be noted that similar systems utilizing flow transfer components other than wicks, different configurations of collapsible/extendable components, other than springs or exchanging compression and tension springs, are also within the scope of these teachings.

In another embodiment of the system of these teachings, shown in FIG. 5, the fuel feed system includes a fuel reservoir (cartridge) 60 and a fluid transfer component 65 operatively connected at one end to the fuel cartridge 60. The fluid transfer component 65 is operatively connected at another end to the input of the pump 10. The fluid transfer component 65 is capable of transferring fuel from the fuel cartridge 60 to the pump 10. In one instance, these teaching not being limited to only that instance, the fluid transfer component 65 comprises a wick.

In one embodiment, the cartridge 60 and the pump 10 are enclosed in a housing 67 and are detachable from the flow measurement component 20, the valve 40, and the controller 30.

It should be noted that although the above embodiments include a more detailed description of the use of the electroosmotic pump, other pumps are within the scope of these teachings. For example, these teachings not being limited only to those examples, electro-hydrodynamic pumps, magnetohydrodynamic poems, electrostatic pumps, and thermal pneumatic and other membrane actuated pumps are within the scope of these teachings.

An electrohydrodynamic pump applies an AC voltage field to a fluid-to-be-pumped. An example of an electrohydrodynamic pump is disclosed in U.S. Pat. No. 4,316,233, entitled "Single Phase Electrohydrodynamic Pump", issued on Feb. 16, 1982, which is hereby incorporated by reference in its entirety. An electrohydrodynamic pump generally works by the attractive and repulsive forces exerted on the fluid by an electric field through Coulombic reaction. Since the electrical field acts on the fluid and not through mechanical pressure, the internal pressure within the fluid does not increase significantly due to the pumping.

A magnetohydrodynamic pump, in embodiments where the fuel is a liquid, applies a magnetic field to a working fluid to move the working fluid in any desired direction. The flow of working fluid can be reversed by reversing the magnetic field. An example of a magnetohydrodynamic pump is disclosed in U.S. Pat. No. 6,241,480, entitled "Micro-magnetohydrodynamic Pump and Method for Operation of the Same", issued on Jun. 5, 2001, which is herein incorporated by reference in its entirety. Any conductive liquid can be the working fluid.

An electrostatic pump is a membrane-displacement pump, which is different than the field-induced pumps discussed above. Instead of applying an electrical or magnetic field (or both) to a fluid and pumping the fluid, a membrane-displacement pump typically includes a membrane or diaphragm and a force applied to the membrane or diaphragm to pump the fluid. In an electrostatic pump, an electrical potential is applied to a membrane or diaphragm causing the membrane or diaphragm to move or to vibrate to pump the fluid. An electrostatic pump is disclosed in U.S. Pat. No. 6,485,273, entitled "Distributed MEMS Electrostatic Pumping Devices", issued on Nov. 26, 2000, which is incorporated herein by reference in its entirety. Another electrostatic pump is disclosed in U.S. Pat. No. 5,336,062, entitled "Microminiaturized Pump", issued on Aug. 9, 1994, which is also incorporated by reference in its entirety.

A thermopneumatic pump is another membrane-displacement pump. In this pump a heating element, e.g., a resistive heating element, is disposed in a pressure chamber and the pressure chamber is operatively connected to the membrane. Thermopneumatic pump and other membrane displacement micropumps are disclosed in U.S. Pat. No. 6,069,392, entitled "Microbellows Actuator", issued on May 30, 2000, and U.S. Pat. No. 6,326,211, entitled "Method of Manipulating a Gas Bubble in a Microfluidic Device" issued on Dec. 4, 2001; both of which are incorporated by reference in their entireties.

Although the teachings have been described with respect to various embodiments, it should be realized these teachings are also capable of a wide variety of further and other embodiments within the spirit and scope of the appended claims.

What is claimed is:

1. A fuel feed system for a fuel cell, the fuel feed system comprising:
    a pump receiving fuel at an input to said pump; said fuel originating from a reservoir;
    a flow sensor operatively connected to an output of said pump; said flow sensor receiving fuel from said pump; an output from said flow sensor being indicative of flow rate in said pump; said output being provided to a controller; a driver for the pump being under control of the controller;
    a valve operatively connected to said flow sensor; said valve receiving fuel from said flow sensor; said valve comprising a pressure inlet port operatively connected to said input of said pump, said pressure inlet port providing an exerted pressure; said exerted pressure being substantially equivalent to an input pressure of said pump; said valve allowing fluid flow from an output of said pump to the fuel cell when an output pressure of said pump exceeds a predetermined pressure, said predetermined pressure including said exerted pressure;
    a flow restriction component operatively connected to an output of said pump; and
    a differential pressure sensor connected across said flow restriction component; an output from said differential pressure sensor being indicative of flow rate in said pump; said output being provided to the controller.

2. The fuel feed system of claim 1 wherein said flow restriction component comprises a capillary conduit.

3. The fuel feed system of claim 1 wherein said flow restriction component is an orifice of predetermined characteristic dimension.

4. The fuel feed system of claim 1 wherein said flow restriction component is a porous disk.

5. The fuel feed system of claim 1 wherein said flow sensor comprises:
    a heating element arranged on a substrate in thermal contact with the fuel;
    temperature sensors arranged on said substrate in thermal contact with the fuel; the temperature sensors being arranged before and after, in a flow direction, the heating element; and
    a processing and control component for processing signals of the temperature sensors;
    said processing and control component substantially determining a flow velocity and providing an output to the pump driver controller.

6. The fuel feed system of claim 1 wherein said valve further comprises:
two ports, a valve inlet port and a valve outlet port;
at least one valve seat circumscribing at least one of said two ports;
a diaphragm having first and second major surfaces; said first major surface acting as a valve face, wherein said first major surface is configured and arranged to cover said at least one valve seat, said first major surface having an open position for providing fluid communication between said valve inlet port and said valve outlet port and a closed position for preventing fluid communication between said valve inlet port and said valve outlet port;
a first-pressure-inlet coupled to said second major surface of said flexible diaphragm, wherein said first-pressure-inlet provides a first pressure to said second major surface;
a reference pressure-providing component operatively coupled to said second major surface of said flexible diaphragm;
said first and second major surfaces having first and second surface areas, respectively;
said fluid communication between said valve inlet port and said valve outlet port occurring when an output force exerted by a valve inlet against the first major surface exceeds an input force exerted by a combination of a reference pressure and the first pressure against the second major surface, said reference pressure being generated by said reference pressure generating component.

7. The fuel feed system of claim 1 wherein said pump comprises an electro-osmotic pump.

8. The fuel feed system of claim 7 wherein said electro-osmotic pump comprises a porous medium, a predetermined characteristic pore size of said porous medium being at most equal to a predetermined bubble characteristic dimension, said predetermined bubble characteristic dimension being between about 01.06 mm and about 2.12 mm.

9. The fuel feed system of claim 7 wherein
said flow restriction component comprises a capillary conduit.

10. The fuel feed system of claim 9 wherein a predetermined characteristic dimension of said capillary conduit is at least equal to a predetermined bubble characteristic dimension, said predetermined bubble characteristic dimension being between about 01.06 mm and about 2.12 mm.

11. The fuel feed system of claim 1 further comprising:
a connector between said pump and a reservoir, the connector comprising a pump-side-sub-connector and a reservoir-side-sub-connector; said connector substantially preventing flow in/out of said reservoir and flow in/out of said pump when in a disengaged configuration; said connector enabling fluid communication between said reservoir and said pump when in an engaged configuration.

12. The fuel feed system of claim 11 wherein:
said pump-side-sub-connector comprises:
a pump-side-housing;
a pump side fluid transfer component disposed in an interior portion of said pump-side-housing and extending from a pump end of said pump-side-housing to a reservoir end of said pump-side-housing;
a first portion of said pump side fluid transfer component having a first end proximate to the pump end of said pump-side-housing; said first portion extending from an exterior of the pump end of said pump-side-housing to an interior of said pump-side-housing;
a second portion of said pump side fluid transfer component having a second end proximate to the reservoir end of said pump-side-housing; said second portion of said pump side fluid transfer component being in fluid communication with said first portion of said pump side fluid transfer component; and
a pump side seal component; said pump side seal component preventing, in a first configuration of said pump-side-sub-connector, fluid transfer out of the pump; at least one portion of said pump side seal being disposed over a portion of said pump side fluid transfer component; and, an extendable/collapsible component operatively connected to said pump side seal component; said extendable/collapsible component capable of retracting said pump side seal component into a second configuration, said at least a portion of said pump side seal component not being disposed, when in said second configuration, over at least part of said portion of said pump side fluid transfer component; and, said reservoir-side-sub-connector, having an engaged configuration and a disengaged configuration, said reservoir-side-sub-connector comprising:
a reservoir-side-housing;
a reservoir side fluid transfer component configured to be, when in said engaged configuration, in fluid communication with said pump side fluid transfer component; said reservoir side fluid transfer component being disposed inside said reservoir-side-housing; and said reservoir side fluid transfer component comprising:
a first reservoir side fluid transfer component portion extending from a location proximate to a reservoir side of said reservoir-side-housing to another location inside said reservoir-side-housing; and
a second portion of said reservoir side fluid transfer component;
said second portion being in fluid communication with said first portion at a first end of said reservoir side fluid transfer component; said reservoir side fluid transfer component also having a second end proximate to a pump side of said reservoir-side-housing; and
a reservoir side seal, in said disengaged configuration, substantially preventing fluid transfer from said second end of said reservoir side fluid transfer component; said reservoir side seal comprising at least a portion disposed over and operatively connected to another collapsible/extendable component; said at least a portion being retracted and allowing, when in said engaged configuration, fluid communication between said reservoir side fluid transfer component and said pump side fluid transfer component; and
a portion of said reservoir-side-housing being sized and dimensioned to be received by the interior of said pump-side-housing; and said reservoir-side-housing having an opening at the pump side end of said reservoir-side-sub-connector; said opening at the pump side end of said reservoir-side-sub-connector leading into an interior of said reservoir-side-sub-connector; said reservoir side seal, in said disengaged configuration, sealing said opening into the interior of said reservoir-side-sub-connector; in said disengaged configuration, flow from said reservoir-side-sub-connector being substantially suppressed; and said reservoir-side-housing and said pump-side-housing being dimensioned so that, in said engaged configuration said pump side fluid transfer component and said reservoir side fluid transfer component are in fluid communication.

13. The fuel feed system of claim 12 wherein, in said connector, said pump side fluid transfer component comprises a wick; and wherein said reservoir side fluid transfer component comprises a wick.

14. The fuel feed system of claim 12 wherein, in said connector, said pump side fluid transfer component comprises a capillary conduit; and wherein said reservoir side fluid transfer component comprises a capillary conduit.

15. The fuel feed system of claim 12 wherein, in said connector, said extendable/collapsible component comprises a spring; and wherein said another collapsible/extendable component comprises a spring.

16. The fuel feed system of claim 12 wherein, in said connector, said pump side seal component comprises:
a seal housing coaxially disposed about said portion of said pump side fluid transfer component; and
a seal disposed within said seal housing and also coaxially disposed about said portion of said pump side fluid transfer component.

17. The fuel feed system of claim 12 wherein said at least one portion of said pump side seal comprises a first and second seal component portion;
said first seal component portion being disposed over a portion of said pump side fluid transfer component; and,
said second seal component portion disposed over said second end of said pump side fluid transfer component; said second seal component portion being attachable/detachable from said first seal portion;
said extendable/collapsible component enabling sealing/unsealing of a seal between said first and said second seal component portion;
wherein said reservoir-side-housing has a channel extending from an opening at the pump side end of said reservoir-side-sub-connector to an opening into the interior of said reservoir-side-sub-connector; said channel being dimensioned to receive said second end of said pump side fluid transfer component; said channel being also dimensioned to receive said second seal component portion;
wherein said first seal component portion not being disposed, when in said second configuration, over at least a part of said portion of said pump side fluid transfer component; and,
wherein said portion of said reservoir-side-housing when received in the interior of said pump-side-housing operatively connects to said first seal component portion; said portion of said reservoir-side-housing, upon connecting to said first seal component portion, separating said first seal component portion from said second seal component portion as said portion of said reservoir-side-housing is inserted into the interior of said pump-side-housing; said second seal component portion, as said portion of said reservoir-side-housing is inserted into the interior of said pump-side-housing, moves along said channel towards the interior of said reservoir-side-housing, and upon reaching said opening into the interior of said reservoir-side-housing, separating said reservoir side seal component from the interior of said reservoir-side-housing;
said portion of said reservoir-side-housing, said channel and said pump side fluid transfer component being sized and dimensioned such that said first seal component portion is first separated from said second seal component portion, and subsequently said reservoir side seal component is separated from the interior of said reservoir-side-housing.

18. The fuel feed system of claim 1 further comprising:
a fuel cartridge; and
a fluid transfer component operatively connected at one end to said fuel cartridge; said fluid transfer component being operatively connected at another end to said input of said pump; said fluid transfer component transferring fuel from said fuel cartridge to said pump.

19. The fuel feed system of claim 18 wherein said pump comprises an electro-osmotic pump.

20. The fuel feed system of claim 19 wherein said electro-osmotic pump comprises a porous medium, a predetermined characteristic pore size of said porous medium being at most equal to a predetermined bubble characteristic dimension, said predetermined bubble characteristic dimension being between about 01.06 mm and about 2.12 mm.

21. The fuel feed system of claim 18 wherein said flow restriction component comprises a capillary conduit.

22. The fuel feed system of claim 21 wherein a predetermined characteristic dimension of said restriction component is at least equal to said predetermined bubble characteristic dimension, said predetermined bubble characteristic dimension being between about 01.06 mm and about 2.12 mm.

23. The fuel feed system of claim 21 wherein said flow restriction component is an orifice of predetermined characteristic dimension.

24. The fuel feed system of claim 21 wherein said flow restriction component is a porous disk.

25. The fuel feed system of claim 2 wherein a predetermined characteristic dimension of said restriction component is at least equal to a predetermined bubble characteristic dimension said predetermined bubble characteristic dimension being between about 01.06 mm and about 2.12 mm.

* * * * *

UNITED STATES PATENT AND TRADEMARK OFFICE
CERTIFICATE OF CORRECTION

PATENT NO.       : 8,703,358 B2                                     Page 1 of 1
APPLICATION NO.  : 12/274567
DATED            : April 22, 2014
INVENTOR(S)      : John Meschter et al.

It is certified that error appears in the above-identified patent and that said Letters Patent is hereby corrected as shown below:

In the claims

In column 14, line 67, (claim 5), "pump driver controller" should read -- controller --

Signed and Sealed this
First Day of July, 2014

Michelle K. Lee
*Deputy Director of the United States Patent and Trademark Office*